United States Patent [19]

Crumb et al.

[11] Patent Number: 4,908,522
[45] Date of Patent: Mar. 13, 1990

[54] PRESSURE-BALANCED PROPORTIONING VALVE WITH VENT-CONTROLLED BYPASS

[75] Inventors: Donald A. Crumb, Granger, Ind.; Robert F. Gaiser, Stevensville, Mich.; John E. Steer, South Bend, Ind.

[73] Assignee: Allied-Signal Inc., Morristown, N.J.

[21] Appl. No.: 274,078

[22] Filed: Nov. 21, 1988

[51] Int. Cl.$^4$ ................................. B60T 8/26
[52] U.S. Cl. .................... 303/9.72; 303/9.75; 60/591
[58] Field of Search ............... 60/562, 591; 188/349; 303/9.62, 9.71, 9.72, 9.73, 9.74, 9.75

[56] References Cited

U.S. PATENT DOCUMENTS

| | | | |
|---|---|---|---|
| 3,597,014 | 8/1971 | Stokes | 188/349 X |
| 3,945,686 | 3/1976 | Orzel | 188/349 X |
| 4,815,292 | 3/1989 | Gaiser et al. | 60/591 X |
| 4,821,519 | 4/1989 | Gaiser et al. | 60/591 |

Primary Examiner—Robert E. Garrett
Assistant Examiner—George Kapsalas
Attorney, Agent, or Firm—Larry J. Palguta; Ken C. Decker

[57] ABSTRACT

A proportioning valve (40) is disposed within a stepped bore (13) of a master cylinder (10). The proportioning valve (40) defines with the stepped bore (13) a primary pressure receiving chamber (26) and a secondary pressure receiving chamber (28). The proportioning valve (40) includes a two-part piston (58) which includes a primary piston part (52) and a secondary piston part (54) coupled together by a lost motion coupling (53, 55). The piston parts (52, 54) are biased apart by a spring (78), and a sleeve (43) is disposed about the two-part piston (50). Seals (46, 47, 69) are disposed about the primary piston part (52), sleeve (43) and secondary piston part (54) to define an intermediate vented chamber (90), wherein a vent (19) communicates with a reservoir. Pressure failure within the primary receiving chamber (26) causes the primary piston part (52) to be displaced and close off the vent (19) so that fluid pressure is trapped within the intermedaite chamber (90) to prevent the secondary piston part (54) from effecting the metering of fluid flow through an outlet (21).

12 Claims, 1 Drawing Sheet

PRESSURE-BALANCED PROPORTIONING VALVE WITH VENT-CONTROLLED BYPASS

BACKGROUND OF THE INVENTION

The present invention relates to a primary pressure-balanced proportioning valve which includes a vent controlled bypass, in particular a proportioning valve which closes communication with the vent in order to utilize trapped fluid pressure to terminate proportioning valve operation.

In general, proportioning valves utilize a differential area piston in the secondary chamber brake system so that when a predetermined pressure level is reached the piston shifts in the direction of the smaller area proportioning valve end. As the piston shifts, the piston contacts a poppet or seal and thus establishes a pressure restriction. Upon a further increase in secondary pressure communicated to the proportioning valve piston, the outlet pressure will rise at a rate determined by the differential areas at each end of the piston. The proportioning valve may include a bypass function so that upon failure of pressure in a chamber of the master cylinder, the proportioning valve responds appropriately and permits full fluid pressure communication to the rear brakes of the vehicle. Such existing designs contain numerous disadvantages such as: the primary and secondary pressure chambers of the master cylinder must be reversed which lengthens the master cylinder body; the master cylinder becoming stroke sensitive rather than pressure sensitive; the system experiencing undesirable fluid displacement loss; additional costly mechanical hardware being required in order to effect a bypass function; additional seals being required; and a widening break-point tolerance resulting. It is highly desirable to provide a proportioning valve assembly with a bypass feature wherein it is not necessary to switch the position of the primary and secondary chambers of the master cylinder. It is also desirable to actuate the proportioning valve assembly by communicating directly pressure from the primary pressure chamber of the master cylinder to the proportioning valve assembly. It is also very desirable to effect the bypass function simply by closing off a vent opening so that trapped fluid pressure effects the bypass function.

SUMMARY OF THE INVENTION

The present invention solves the above problems and comprises a proportioning valve in combination with a master cylinder, the master cylinder comprising a primary pressure chamber and a secondary pressure chamber, communication means for communicating fluid from the respective pressure chambers to a bore having said proportioning valve disposed therein, the bore having at one end a primary pressure receiving chamber and at the other end a secondary pressure receiving chamber, the secondary pressure receiving chamber having an outlet opening, a two-part piston disposed within said bore and having a primary part received in the primary pressure receiving chamber and a secondary part received in the secondary pressure receiving chamber, the primary and secondary parts coupled together so as to allow movement between the parts, sleeve means disposed about said two-part piston, sealing means disposed about said sleeve means and primary part to define an intermediate chamber communicating with a vent having a vent opening at said bore, the secondary part comprising a differential area piston and having a seal member disposed thereabout and engaging said sleeve means, and a sealing member disposed about said secondary part and retained in place by said sleeve means, so that failure of pressure in the primary chamber causes the primary part to be displaced and close communication with said vent opening whereby fluid is captured within said sleeve means and prevents said secondary part from being displaced.

BRIEF DESCRIPTION OF THE DRAWINGS

The invention is described in detail below with reference to the drawings which illustrate an embodiment in which.

DETAILED DESCRIPTION OF THE PREFERRED EMBODIMENT

Figure 1:
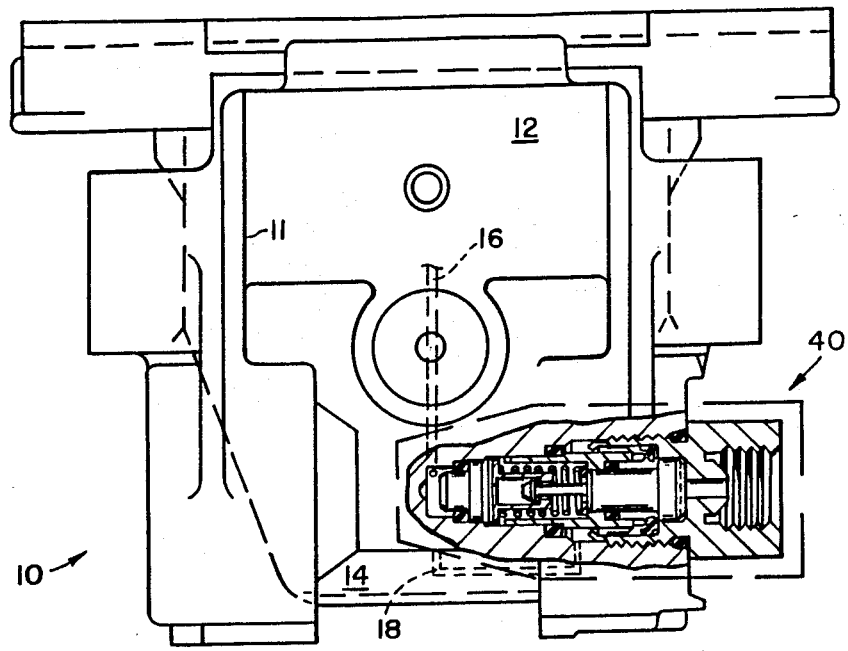
FIG. 1 is a section view of the proportioning valve and master cylinder of the present invention.
Figure 2:
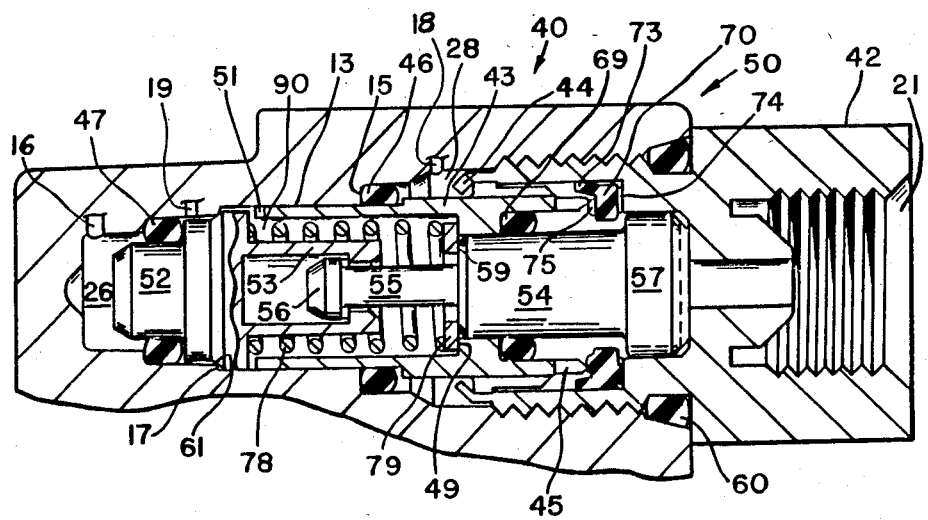
FIG. 2 is a partial section view of FIG. 1.

The master cylinder is designating generally by reference numeral 10 in FIG. 1. The master cylinder is of the type designated "Recessed Cartridge Master Cylinder" and disclosed in U.S. Pat. No. 4,474,005. It should be clearly understood that the present invention may be utilized with many other types of master cylinders and it is not restricted to use with just a recessed cartridge master cylinder. The master cylinder 10 includes a primary chamber (not shown) located internally of an end 12 and a secondary chamber (not shown) located internally of end 14. A passage way or communication means 16 extends from the primary chamber to a primary pressure receiving chamber 26 located within master cylinder housing 11. A passage way or communication means 18 extends between the secondary pressure chamber and a secondary pressure receiving chamber 28 located within housing 11. A vent 19 extends to a reservoir (not shown) of the master cylinder. The proportioning valve assembly is designated generally by reference numeral 40 and comprises a valve fitting 42 received threadedly in transverse bore 13 of housing 11. Three prior applications disclosing screw-in proportioning valve assemblies comprise U.S. Pat. No. 4,821,519 dated April 18, 1989, entitled "Primary Pressure-Balanced Proportioning Valve" which discloses a through-the-center bypass proportioning valve assembly; U.S. Pat. No. 4,815,292 dated March 28, 1989, entitled "Primary Pressure-Balanced Proportioning Valve With Brake Pressure Failure Switch" which discloses a through-the-center bypass proportioning valve in combination with the warning switch mechanism, and Continuation-in-Part Ser. No. 266,964 entitled "Primary and Secondary Pressure-Balanced Proportioning Valve" which discloses a through-the-center bypass proportioning valve assembly with a warning switch actuating sleeve that is integral with a piston part. Fitting 42 includes an outlet opening 21. Bore 13 comprises a stepped bore which extends from the primary pressure receiving chamber 26 to the secondary pressure receiving chamber 28. Proportioning valve assembly 40 includes a sleeve 43 clasped to fitting 42 by means of flange 44. Stepped bore 13 provides a shoulder 15 for engagement by a seal 46 disposed about sleeve 43. Sleeve 43 is disposed about a differential area piston 50 which comprises a two-part piston that includes a primary piston part 52 and a secondary piston part 54. Primary piston part 52 includes a seal 47 disposed about an end and the opposite end has extending members 53.

Secondary piston part 54 includes an extension 55 having a head 56 captured within extending members 53 in order to provide a lost motion coupling between piston parts 52, 54. Sealing member 69 is disposed between secondary piston part 54 and sleeve 43. Secondary piston part 54 includes a head 57 that may engage a sealing mechanism 70. Sealing mechanism 70 includes a flexible pumping arm 73, radial passageways 74, and spaced-apart circumferential abutments 75. The interior diameter of sealing mechanism 70 is spaced radially apart from the exterior surface of secondary piston part 54. Abutments 75 are engaged by end 45 of sleeve 43 so that sealing mechanism is held axially in place. Fitting 42 is threadedly engaged in stepped bore 13 and a seal effected therebetween by seal member 60. Disposed between the primary and secondary piston parts is a resilient member 78 which biases the piston parts away from one another. One end of resilient member 78 engages a washer 79 that abuts a shoulder 49 of sleeve 43 and also abuts a shoulder 59 of second piston part 54.

Seal 46, seal 47, and sealing member 69 disposed about secondary piston part 54 and within sleeve 43, define an intermediate vented chamber 90. Vented chamber 90 communicates with vent 19 to prevent fluid flow therebetween. Primary piston part 52 includes a frustoconical portion 61 which is disposed adjacent a stepped portion 17 of stepped bore 13.

Proportioning valve assembly 40 is shown in an released position. When the vehicle operator depresses the brake pedal, primary and secondary pressures are received from the respective chambers of the master cylinder. The primary and secondary pressures are essentially equal, and at a predetermined pressure primary piston part 52 moves slightly rightward to contact sleeve end 51, this slight rightward movement occurring before the secondary piston part 54 moves leftward. As braking pressure from the master cylinder increases, a break-point is reached at a predetermined pressure and the secondary piston part 54 moves to the left toward sealing mechanism 70. The approach of head 57 toward sealing mechanism 70 effects a proportioning of secondary pressure through outlet 21.

If primary pressure should fail, primary piston part 52 and the proportioning valve assembly are no longer supported by primary pressure. Therefore, primary piston part 52 moves leftward so that the frustoconical portion 61 engages stepped shoulder 17 and closes off communication of vent 19 with intermediate vented chamber 90. The fluid flow path from the intermediate vented chamber to the reservoir is closed so that fluid pressure is trapped within the intermediate chamber and secondary piston part 54 can no longer move leftward and effect the proportioning of secondary brake pressure. Because fluid pressure is trapped within intermediate vented chamber 90, the proportioning of secondary fluid pressure is prevented and the secondary outlet pressure remains equal to the inlet pressure received at communication means 18.

The proportioning valve assembly of the present invention provides substantial advantages over prior proportioning valve designs. The valve assembly has a low cost due to the minimum number of pieces and the easily molded plastic piston parts. The assembly 40 comprises a compact cartridge which screws into the master cylinder outlet port. There is essentially a negligible fluid displacement loss due virtually to the very small movement of the primary piston part 52 when primary pressure failure occurs. The assembly is pressure differential sensitive due to the vent remaining closed during the primary pressure failure. Reversal of the chambers of the master cylinder is not required, and the utilization of the single sealing mechanism 70 reduces friction tolerance to provide a low tolerance break-point of the characteristic pressure output curve.

Various modifications of the above-described embodiment of the invention will be apparent to those skilled in the art. It is to be understood that such modifications can be made without departing from the scope of the invention.

We claim:

1. A proportioning valve in combination with a master cylinder, the master cylinder comprising a primary pressure chamber and a secondary pressure chamber, communication means for communicating fluid from the respective pressure chambers to a bore having said proportioning valve disposed therein, the bore having at one end a primary pressure receiving chamber and at the other end a secondary pressure receiving chamber, the secondary pressure receiving chamber having an outlet opening, a twopart piston disposed within said bore and having a primary part received in the primary pressure receiving chamber and a secondary part received in the secondary pressure receiving chamber, the primary and secondary parts coupled together so as to allow movement between the parts, sleeve means disposed about said two-part piston, sealing means disposed about said sleeve means and primary part to define an intermediate chamber communicating with a vent having a vent opening at said bore, the secondary part comprising a differential area piston and having a seal member disposed thereabout and engaging said sleeve means, and a sealing member disposed about said secondary part and retained in place by said sleeve means, so that failure of pressure in the primary chamber causes the primary part to be displaced and close communication with said vent opening whereby fluid is captured within said sleeve means and prevents said secondary part from being displaced.

2. The proportioning valve and master cylinder in accordance with claim 1, wherein resilient means is disposed between said primary and secondary parts, the resilient means biasing the parts away from one another.

3. The proportioning valve and master cylinder in accordance with claim 2, wherein the outlet opening is disposed within a fitting that is attached to said sleeve means.

4. The proportioning valve and master cylinder in accordance with claim 3, wherein the primary part includes extending members and the secondary part includes an extension with a head, the head snap-fitted within the extending members.

5. The proportioning valve and master cylinder in accordance with claim 4, wherein the vent communicates with a reservoir.

6. A proportioning valve having a vent controlled led bypass function, the valve disposed within a stepped bore and defining with the bore a primary pressure receiving chamber and a secondary pressure receiving chamber, the proportioning valve comprising a two-part piston including a primary piston part and a secondary piston part coupled together to allow movement between the parts, sleeve means disposed about said two-part piston, seal means disposed about said primary piston part and said sleeve means in order to define an intermediate chamber, a vent extending to a vent opening that intersects said bore and communicates with said intermediate chamber, a sealing member disposed about said secondary piston part and a sealing mechanism disposed adjacent said outlet, the secondary piston part comprising a differential area piston above to be displaced and, in combination with said sealing mechanism, effecting the restriction of fluid flow past said secondary piston part and through said outlet, failure of pressure in the primary pressure receiving chamber causing displacement of said primary piston part to effect a closing off of the communication with said vent opening whereby fluid pressure is trapped within said intermediate chamber and prevents said secondary piston part from operating.

7. The proportioning valve in accordance with claim 6, wherein the primary piston part includes a frustoconical section and the bore includes a stepped shoulder adjacent the vent opening, the frustoconical part displaced into engagement with the stepped shoulder in order to effect said closing off of the communication with the vent opening.

8. The proportioning valve in accordance with claim 7, further comprising resilient means disposed between said primary piston part and secondary piston part in order to bias the parts away from one another.

9. The proportioning valve in accordance with claim 8, wherein the sleeve means includes a shoulder which is biased by said resilient means.

10. The proportioning valve in accordance with claim 6, wherein the sleeve means extends to position in place the sealing mechanism.

11. The proportioning valve in accordance with claim 6, wherein the seal means, bore, sleeve means, sealing member, and piston parts define the intermediate chamber.

12. The proportioning valve in accordance with claim 11, wherein the intermediate chamber extends interiorly of the sleeve means.

* * * * *